No. 634,947. Patented Oct. 17, 1899.
C. H. LOEW.
FILTER APPARATUS.
(Application filed Feb. 20, 1899.)

(No Model.) 2 Sheets—Sheet 1.

ATTEST
K. Bureir
H. E. Mison.

INVENTOR
CHARLES H. LOEW
BY H. J. Fisher ATTY.

No. 634,947. Patented Oct. 17, 1899.
C. H. LOEW.
FILTER APPARATUS.
(Application filed Feb. 20, 1899.)
(No Model.) 2 Sheets—Sheet 2.
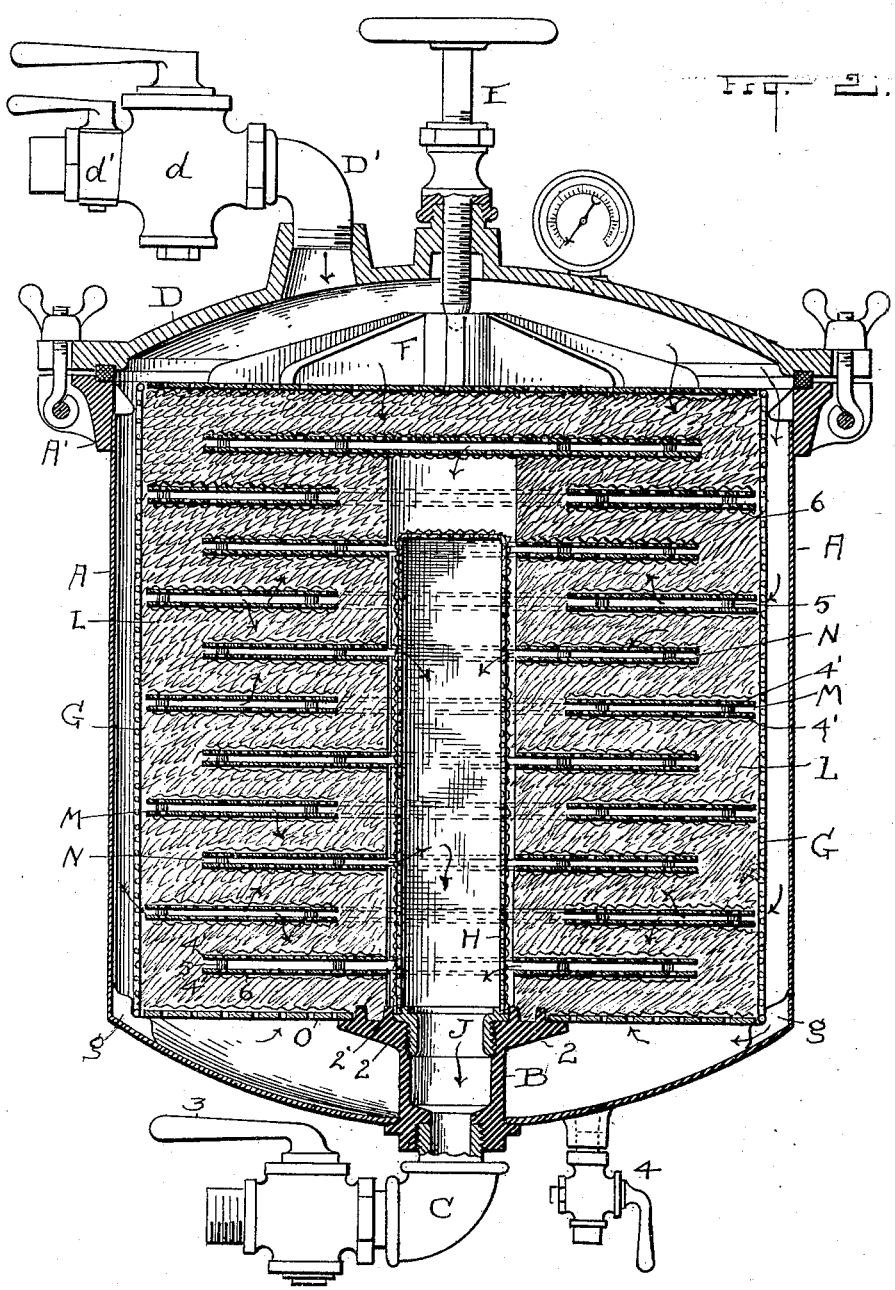
ATTEST
INVENTOR.
CHARLES H. LOEW.
BY
H. T. Fisher
ATTY

UNITED STATES PATENT OFFICE.

CHARLES H. LOEW, OF CLEVELAND, OHIO.

FILTER APPARATUS.

SPECIFICATION forming part of Letters Patent No. 634,947, dated October 17, 1899.

Application filed February 20, 1899. Serial No. 706,094. (No model.)

*To all whom it may concern:*

Be it known that I, CHARLES H. LOEW, a citizen of the United States, residing at Cleveland, in the county of Cuyahoga and State of Ohio, have invented certain new and useful Improvements in Filter Apparatus; and I do declare that the following is a full, clear, and exact description of the invention, which will enable others skilled in the art to which it appertains to make and use the same.

My invention relates to filter apparatus; and the invention consists in a filter or apparatus adapted to filter beer, wine, and other fermented liquids, all substantially as shown and described, and particularly pointed out in the claims.

Figure 1:
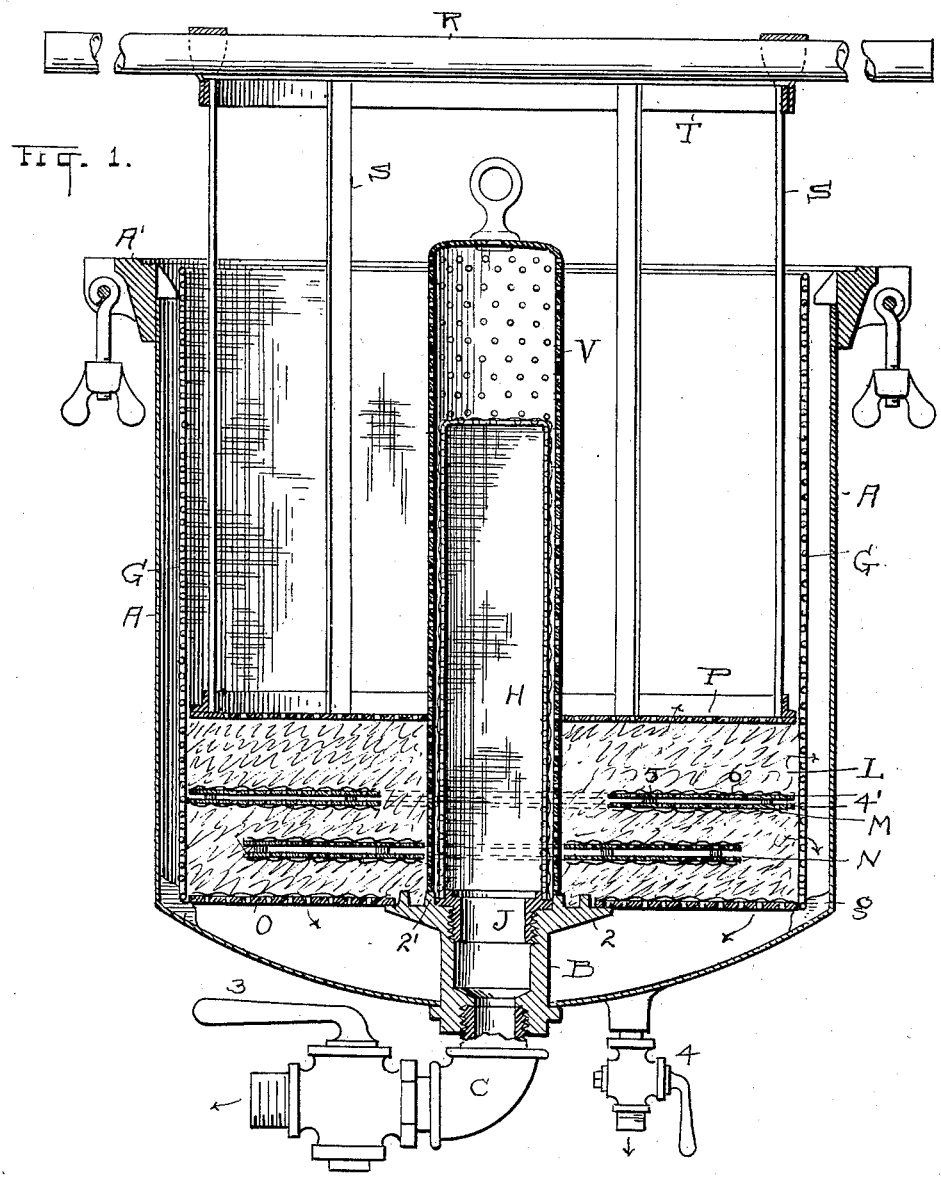
Figure 2:
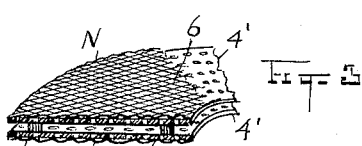

In the accompanying drawings, Figure 1 is a vertical central sectional elevation of the filter as it is seen when it is being set up or prepared for service and showing the preparatory parts in working position. Fig. 2 is a central sectional elevation of the filter as it is filled with the filtering material and elements and in working condition. Fig. 3 is a perspective elevation of a section of one of the "filtering-disks," so-called.

In apparatus of this general character the rapidity or speed at which filtration can be accomplished is a desideratum no less important than the thoroughness with which it is done, and especially is this true since apparatus for this purpose is at best expensive and a considerable tax upon the user. I have therefore sought to combine in one machine all the demands of the trade, so far as the quality and the quantity of the work done are concerned, along with simplicity and economy of construction, thus bringing the initial cost of the apparatus down to where it is generally accessible to the trade.

Referring now again to the drawings, A represents the casing or shell of the filter, which is circular in cross-section, preferably, and has a concave bottom, into which is tapped at its center the outlet or discharge coupling or joint B, which has a flange 2 about its top, forming a support for certain elements of the interior of the filter, as will hereinafter appear.

The discharge-pipe section C for the filtered liquid is threaded into joint B and has a controlling cock or valve 3, and there is also a separate valve-controlled outlet 4 in the bottom of the casing to carry away any accumulations of water or the like as they may occur in the said bottom by reason of compressing the filter mass or from other causes.

At its top the casing has a ring A', upon which is temporarily secured the cover D by turnbuckles or other means, serving, as shown, or by any other suitable means, with a packing-ring or gasket to make a perfectly-tight joint. The fluid to be filtered enters through the elbow-joint D', having two valves $d$ and $d'$, respectively. Centrally at the top of the cover D is a hand-screw E, projecting through to the interior, where it bears upon the spider F, adapted to rest upon the top of the filtering-pile and hold the material firmly down in place.

Internally we have, first, a wire-mesh crib G, sufficiently smaller in cross-section than the casing A to leave a fluid-space between them all around and the full depth of the said parts, and at its bottom said crib or cage rests on shoulders $g$ in the angles of the side and bottom of casing A, but with space between the shoulders for the free circulation of liquid into the bottom.

Corresponding in part to cage G centrally of the filter and adapted to fit over or upon the outlet-coupling B for the filtered liquid is the open-wire-mesh tube H. This tube is closed with mesh across its top, as at its sides, but open at its bottom, where it is fixed, preferably, to an upward flange on the small collar J and rests between said collar and the flange 2' on the coupling B, thus forming a doubly-flanged seat for the said tube. This tube H is firm enough to form a wall which will resist any pressure or tendency to crowd toward the center in the filtering mass as it is compressed and yet open enough also to afford free outlet for the filtered liquid. So, also, the open-work crib or cage G forms an outer wall as well as a sufficiently free inlet for the fluid under such pressure from without as will force it through the filter mass within.

This brings us to the consideration of the filtering means, comprising two sets of liquid-conductors M and N, respectively, and the filtering mass L intermediate thereof and in which said conductors are embedded. All of the said conductors are alike in construction, but the distributing-conductors M are somewhat larger than the receiving-conductors N, and the two are alternately disposed. Each is constituted by two numerously-perforated plates 4', spaced and connected by rivets and short spools or the like 5 here and there, so as to leave a sheet of open space between the plates and are covered with wire mesh or gauze 6. Both edges of both sets of conductors are open, and the outer edges of the receiving-conductors are out practically in contact with the crib G and spaced away from the tube H at their inner edge relatively about as far as they are from the next receiving-conductor N above or below. On the other hand the receiving-conductors N all approach close to the tube H at their inner edges, while they are removed from the outer wall G the same distance substantially as they are from the nearest conductors M above or below. This construction and arrangement of conductors gives the largest possible filtering area that can be obtained in an apparatus of this size, and, as I believe, far exceeds any other apparatus in this respect, at least so far as I know, and, of course, is the secret of the phenominal filtering capacity of this structure.

It will be noticed that the fluid under pressure will flow into the filter through the comparatively open channels afforded in each and all the distributing-conductors M, which with their double open sides afford together an enormous distributing-surface. The same is also true of the receiving-conductors N, which extend their double-sided open-work areas out into the pulp all around to take up the filtered liquid and carry it to the receiving-tube H, whence it flows cleansed out of the apparatus. Each of the said conductors is fashioned in substantially disk shape, being flat and circular, as here shown, and adapted by its central opening to be put in position over the central tube H, which is built into the apparatus from the beginning, when the packing of the apparatus occurs. If the structure were oblong or angular or of other shape in cross-section, there would be mere adaptation of the conductors thereto, and this change would make no difference in the invention; but obviously a perfectly round or cylindrical formation is preferable.

Referring now to Fig. 1, the method of packing the filter is fully illustrated. Here it will be seen that all the several parts constituting the filter are in place to begin with except the entire series of conductors M and N. It may be assumed that the filter has been emptied for cleansing and is now being packed again for use. Hence the crib G and the tube H, as well as the open-work bottom O and the series of conductors, are all separately removable. The bottom O really is the bottom proper of the crib and rests on the shoulders g outside and on the flange 2 at its inside and has as its body a perforated plate of such firmness as will enable it to withstand all the operations of compressing the filtering material and to carry the superposed load, and a gauze covering insures the retention of the pulp or other filtering media. Having placed the crib, tube, and bottom O in place, the next thing to do is to fill in a sufficient quantity of liquid packing to obtain a body of compressed packing corresponding to the depth thereof shown beneath the first lower conductor in Fig. 1. The said lower conductor N is then placed in position and another layer of filtering media is compressed thereon, and so on to the top, as is obvious.

In the operation of compressing, in which most of the liquid in the pulp is pressed out, I may use any sufficient means; but a simple and satisfactory construction may be as here shown, wherein a perforated follower P rests directly upon the pulp and is pressed down by a bar R and intervening uprights S, and ring T, engaged by said lever, and the weight of the packers alone may suffice to expel the water sufficiently from the pulp. It is, however, desirable that the packing shall not be dense or close up to the tube H, but rather that there should be a comparatively free space immediately next to said tube in order that the liquid flowing through the conductors N especially shall have room to distribute itself more or less over the surface of the tube H and get free egress from the filter. To these ends I introduce a tubular perforated space-former V, adapted to sleeve over tube H, and which is withdrawn when the packing about and above tube H has been finished. Then replacing top cover D the spider F is turned down and pressure is applied through the hand-screw E on the entire mass beneath and the apparatus is ready for use.

What I claim is—

1. A filtering apparatus having two series of hollow flat conductors alternately arranged one above the other, one series constructed to distribute the liquid to the filtering mass to be filtered, and the other series to convey the filtered liquid away, substantially as described.

2. The filtering apparatus having a casing and crib spaced apart to receive the unfiltered liquid, and an open-work tube centrally to receive the filtered liquid, in combination with a series of flat conductors having a central liquid-passage and open-work sides and arranged alternately as receiving and discharging conductors, respectively, substantially as described.

3. The casing and the crib therein and the central discharge-tube perforated from end to end, in combination with a series of flat open-work liquid-conductors having their outer edges near said crib, and a series of open-work conductors for the filtered liquid having their inner edges adjacent to said central discharge-tube, substantially as described.

4. A filter having a chamber for the filtering mass surrounded by an open-work wall, in combination with a series of liquid-distributers and a series of liquid-receivers alternately arranged, and said distributers and receivers constructed with a central liquid-space extending from edge to edge thereof and having top and bottom portions of perforated plates and gauze coverings, and the edges of said parts open, and an open-work perforated tube centrally of said apparatus to receive the filtered liquid, substantially as described.

5. The apparatus comprising the casing, the open-work crib and the open-work tube centrally of the crib, in combination with the two series of liquid-conductors having open-work top and bottom sides and a central fluid-space from edge to edge, the outer edge of one series having its outer edge next to said crib and its inner edge buried in the filtering material, and the inner edge of the other series next to said central open-work tube and its outer edge buried in the filtering material, substantially as described.

6. As a new article of manufacture, a liquid-conductor for filters constructed of two perforated plates spaced apart to leave a liquid-traveling area between them and having gauze coverings on their sides, and open edges, and a central opening from side to side, substantially as described.

7. In a filtering apparatus, the main casing and the open-work crib therein, and a stationary perforated central tube, in combination with a removable perforated packing-tube constructed to sleeve over said stationary tube, and means to press upon the filter mass within the crib about said tubes and pack the mass, substantially as described.

Witness my hand to the foregoing specification this 13th day of February, 1899.

CHARLES H. LOEW.

Witnesses:
H. T. FISHER,
R. B. MOSER.